(12) United States Patent
Baessler et al.

(10) Patent No.: US 9,378,178 B1
(45) Date of Patent: Jun. 28, 2016

(54) ENHANCING HTTP CACHING BY ALLOWING CONTENT SHARING OF DATA BLOCKS ACROSS RESOURCES IDENTIFIED BY DIFFERENT UNIFORM RESOURCE LOCATORS

(71) Applicant: International Business Machines Corporation, Armonk, NY (US)

(72) Inventors: Michael Baessler, Nickartenzlingen (DE); Si Bin Fan, Beijing (CN); Peng Hui Jiang, Beijing (CN); Ying Shen, Beijing (CN); Yan Xu, Beijing (CN); Ling Zhang, Shanghai (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/953,746

(22) Filed: Nov. 30, 2015

(51) Int. Cl.
*G06F 15/167* (2006.01)
*H04L 29/08* (2006.01)
*H04L 29/06* (2006.01)

(52) U.S. Cl.
CPC ............. *G06F 15/167* (2013.01); *H04L 67/02* (2013.01); *H04L 67/1097* (2013.01); *H04L 69/22* (2013.01)

(58) Field of Classification Search
CPC ............. H04L 67/2842; H04L 67/02; G06F 17/30575; G06F 17/30902; G06F 17/30899
USPC .................................................. 709/213, 203
See application file for complete search history.

(56) References Cited

U.S. PATENT DOCUMENTS

| 6,233,606 | B1 * | 5/2001 | Dujari ............... G06F 17/30902 707/E17.12 |
| 6,886,013 | B1 | 4/2005 | Beranek |
| 7,320,023 | B2 | 1/2008 | Chintalapati et al. |
| 7,499,996 | B1 * | 3/2009 | Buchheit ........... G06F 17/30902 709/203 |

(Continued)

FOREIGN PATENT DOCUMENTS

| CN | 100462964 C | 2/2009 |
| WO | 2014134234 A1 | 9/2014 |

OTHER PUBLICATIONS

Sanderson, Steven, "Partial Output Caching in ASP.NET MVC," http://blog.stevensanderson.com/2008/10/15/partial-output-caching-in-aspnet-mvc/, Oct. 15, 2008, pp. 1-11.

*Primary Examiner* — Duyen Doan
(74) *Attorney, Agent, or Firm* — Robert A. Voigt, Jr.; Winstead, P.C.

(57) ABSTRACT

A method, system and computer program product for improving performance in connection with requesting resources. A request is sent by a browser to a server to retrieve a resource, where the message includes identifiers and tags associated with blocks of data of the resource which are stored in a cache of the client. If the browser receives a response from the server indicating that the resource has not change since last accessed, the browser will determine if one of the tags associated with the data blocks of the resource stored in the cache differs from the associated tags received in the response message. If there is not a match, then the browser has identified the situation where a block of data of the resource has outdated content which can be updated using the content stored in the data block of another resource in the cache with the same identifier.

20 Claims, 8 Drawing Sheets

(56) References Cited

U.S. PATENT DOCUMENTS

| | | | |
|---|---|---|---|
| 7,509,404 B2 | 3/2009 | Agrawal et al. | |
| 7,594,001 B1 | 9/2009 | Ebbo et al. | |
| 7,805,670 B2 | 9/2010 | Lipton et al. | |
| 8,243,313 B2 | 8/2012 | Varga et al. | |
| 8,370,452 B2 | 2/2013 | Harvell et al. | |
| 8,745,183 B2 | 6/2014 | Olston | |
| 9,021,051 B1* | 4/2015 | Taller | H04L 67/2842 709/213 |
| 9,253,278 B2* | 2/2016 | Hayton | H04L 67/2852 |
| 2005/0033926 A1* | 2/2005 | Dumont | G06F 17/30902 711/138 |
| 2005/0131900 A1* | 6/2005 | Palliyll | H04L 67/2819 |
| 2007/0198634 A1* | 8/2007 | Knowles | G06F 17/30902 709/203 |
| 2008/0235326 A1* | 9/2008 | Parsi | H04L 67/2842 709/203 |
| 2009/0083442 A1* | 3/2009 | Sutter | G06Q 10/06 709/248 |
| 2009/0254707 A1 | 10/2009 | Alstad | |
| 2012/0066586 A1* | 3/2012 | Shemesh | G06F 17/30902 715/235 |
| 2013/0110906 A1* | 5/2013 | Zearing | G06F 17/30902 709/203 |
| 2014/0344341 A1 | 11/2014 | Panzer et al. | |

* cited by examiner

| URL | ID | TAG |
|---|---|---|
| A | SPORTS | x234dff |
| A | CAR | x234dfu |
| A | MOVIE | x324cds |
| A | FINANCE | x876fxf |
| B | HEALTH | x103fsc |
| B | SPORTS | x234dff |
| B | MOVIE | x324cds |
| B | MUSIC | x985fcr |

ENHANCING HTTP CACHING BY ALLOWING CONTENT SHARING OF DATA BLOCKS ACROSS RESOURCES IDENTIFIED BY DIFFERENT UNIFORM RESOURCE LOCATORS

TECHNICAL FIELD

The present invention relates generally to HyperText Transfer Protocol (HTTP) caching, and more particularly to enhancing HTTP caching by allowing content sharing of data blocks across resources identified by different Uniform Resource Locators (URLs).

BACKGROUND

HyperText Transfer Protocol (HTTP) is an application protocol for distributed, collaborative, hypermedia information systems. HTTP functions as a request-response protocol in the client-server computing model. A web browser, for example, may be the client and an application running on a computer hosting a web site may be the server. The client submits an HTTP request message to the server. The server, which provides resources, such as HTML files and other content, or performs other functions on behalf of the client, returns a response message to the client. The response contains completion status information about the request and may also contain the requested content in its message body.

HTTP resources are identified and located on the network by Uniform Resource Locators (URLs), using the Uniform Resource Identifier (URI) schemes http and https. A URL (commonly informally referred to as a "web address") is a reference to a web resource that specifies its location on a computer network and a mechanism for retrieving it.

HTTP is designed to permit intermediate network elements to improve or enable communications between clients and servers. However, fetching a resource using HTTP can be time consuming. For example, the retrieval of a resource may require several interactions between the client and the server.

As a result, an HTTP cache may be utilized by the web browser to store local copies of web resources for faster retrieval the next time the resource is required. When a resource is fully cached, the web browser may choose to not contact the server at all and simply use its own cached copy thereby improving performance by reducing the interactions between the client and the server as well as reducing server load (server does not need to fetch the requested resource) and improving response time (faster to retrieve resource from the cache than from the server).

However, such HTTP caching mechanisms, which utilize the HTTP/1.1 protocol, cache the resource based on the URL. Hence, when a client requests a resource associated with a different URL than those resources cached, the client will have to request the resource from the server. However, the requested resource may include content that was previously cached, even though it is associated with a different URL. As a result, performance is hindered since the client cannot reuse the previously cached content since it is associated with a different URL and the client is required to request the content from the server.

Therefore, there is a need in the art for improving performance in connection with requesting resources by reducing server load and improving response time by having the client be able to utilize previously cached content that is requested even though it is associated with a different URL.

BRIEF SUMMARY

In one embodiment of the present invention, a method for improving performance in connection with requesting resources comprises sending a first request message to a server to retrieve a first resource identified by a first uniform resource locator, where the first request message comprises identifiers and tags associated with blocks of data of the first resource which are stored in a cache. The method further comprises receiving a first response message from the server, where the first response message contains updated content for a first block of data and an updated tag associated with the first block of data of the first resource in response to a value of a first tag in the first request message associated with the first block of data not matching a value of a tag stored in the server associated with the first block of data. The method additionally comprises modifying, by a processor, content of the first block of data and the associated first tag of the first resource in the cache using the received updated content and the updated tag. Furthermore, the method comprises sending a second request message to the server to retrieve a second resource identified by a second uniform resource locator, where the second request message comprises identifiers and tags associated with blocks of data of the second resource which are stored in the cache. The content of a second block of data of the second resource corresponds to an older version of content of the first block of data of the first resource that was modified, where a second tag associated with the second block of data of the second resource corresponds to an older version of the first tag, wherein the tags in the second request message comprises the first tag. Additionally, the method comprises receiving a second response message from the server indicating that the second resource has not change since last accessed. In addition, the method comprises modifying, by the processor, content of the second block of data and the associated second tag of the second resource stored in the cache using content from the first block of data and the first tag of the first resource, respectively, from the cache.

In this manner, the content for a data block can be updated using the local cache of the client device as opposed to being required to fetch the updated content from the web server. As a result, performance is improved by reducing server load and improving response time by having the client device be able to utilize previously cached content that is requested even though it is associated with a different URL.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
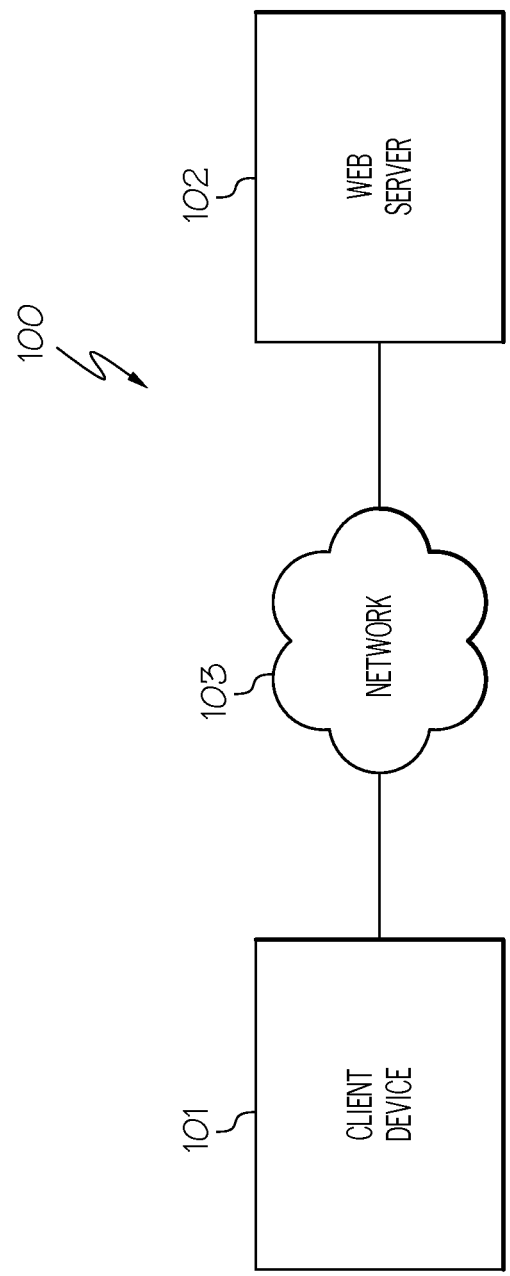
FIG. 1 illustrates a communication system configured in accordance with an embodiment of the present invention.

The present invention comprises a method, system and computer program product for improving performance in connection with requesting resources. In one embodiment of the present invention, a request is sent by a web browser of a client device to a web server to retrieve a first resource identified by a uniform resource locator, where the request message includes identifiers and tags associated with blocks of data of the first resource which are stored in a cache of the client device. An "identifier," as used herein, identifies a storage area in the local cache of the client device. The "tag," as used herein, identifies a specific version of the associated block of data found at a uniform resource locator. A response message is then received from the web server containing updated content for a block of data of the requested resource along with an updated tag associated with the updated block of data in response to a tag in the request message associated with the block of data not matching the tag stored in the web server associated with that block of data. The web browser then updates the content for that block of data along with the tag associated with that block of data in the local cache of the client device using the received updated content and the received updated tag. The web browser later sends a further request message to the web server for a second resource identified by a different uniform resource locator. The second resource includes one or more blocks of data that are identified with the same identifier as one or more of the blocks of data of the first resource, such as the block of data that was updated. The request message includes the identifiers and tags associated with the blocks of data of the second resource which are stored in the local cache of the client device. The web browser then receives a response from the web server that includes the identifiers and tags of the second resource. If the web browser receives a response from the web server indicating that the second resource has not change since last accessed, the web browser will check to determine if one of the tags associated with the data blocks of the second resource stored in the local cache of the client device differs from the associated tags received in the response message. If there is not a match, then the web browser has identified the situation where the second resource has outdated content in one of its data blocks stored in the local cache of the client device since its associated tag will be an older version than currently stored in the web server. In such a situation, the web browser can update the outdated content in the data block of the second resource using the content stored in the data block of another resource, such as the first resource, in the local cache of the client device with the same identifier.

In this manner, the content for a data block can be updated using the local cache of the client device as opposed to being required to fetch the updated content from the web server. As a result, performance is improved by reducing server load and improving response time by having the client device be able to utilize previously cached content that is requested even though it is associated with a different URL.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 for practicing the principles of the present invention in accordance with an embodiment of the present invention. Communication system 100 includes a client device 101 connected to a web server 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with web server 102. A hardware configuration of a client device 101 is discussed below in connection with FIG. 2.

Client device 101 is configured to request for a specific resource from web server 102, such as via a web browser, using an application protocol, such as HyperText Transfer Protocol (HTTP). HTTP resources are identified and located on the network by Uniform Resource Locators (URLs). In one embodiment, the data associated with the resource is comprised of several blocks of data, where each bock of data is associated with an identifier as well as a tag (e.g., ETag). The blocks of data along with the associated identifiers and tags are stored in a local cache of client device 101, such as a resource cache of the web browser. The "identifier," as used herein, identifies a storage area in the local cache of client device 101. The "tag," as used herein, identifies a specific version of the associated block of data found at a uniform resource locator. In one embodiment, such tags are assigned by web server 102.

As will be discussed in further detail below, the blocks of data for a resource identified by a URL is stored in the local cache of client device 101. Some of these blocks of data may also be utilized by other resources identified by other URLs. When the content of one of these blocks of data is updated for a resource, the corresponding content that is shared by another resource does not need to be updated by fetching the updated content from web server 102. Instead, the updated content can be fetched from the local cache of client device 101. In this manner, performance is improved by reducing server load and improving response time by having client device 101 be able to utilize previously cached content that is requested even though it is associated with a different URL.

Furthermore, in one embodiment, a copy of the tags, identifiers and associated URLs may be stored in a data structure, which resides in a data storage unit (e.g., memory, auxiliary storage device) of client device 101. When the content to a data block is updated, its associated tag will be updated as well. The updated tag will be stored in this data structure.

When client device 101 requests to retrieve a resource containing this data block, client device 101 will send the request message to web server 102 containing this updated tag. If the requested resource has not changed since it was last accessed, web server 102 will send a response message to client device 101 indicating that the requested resource has not changed since it was last accessed as well as include the tags (including the updated tag) associated with the requested resource.

Client device 101 may then determine if the content of a data block for this resource needs to be updated by comparing the tag received in the response message with the corresponding tag stored in the local cache associated with that data block. If there is not a match between these tags, then client device 101 will update the content of that data block using the content of a data block stored in the local cache of client device 101 that is associated with the same identifier and updated tag even though it is associated with a different resource. In this manner, the content for that data block can be updated using the local cache of client device 101 as opposed to being required to fetch the updated content from web server 102.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Web server 102 is a server that stores, processes and delivers web pages to client devices 101 by processing requests from client devices 101 via HTTP. Web server 102 is connected to network 103 by wire or wirelessly. A hardware configuration of web server 102 is discussed below in connection with FIG. 5. While FIG. 1 illustrates web server 102 as being a computer system, web server 102 may correspond to an appliance or to software that accepts and supervises the HTTP requests.

As discussed above, client device 101 (web browser) is configured to request for a specific resource from web server 102 using HTTP. Web server 102 responds with the content of that resource or an error message if unable to do so. The resource is typically a file on the server's secondary storage, but this is not necessarily the case and depends on how web server 102 is implemented.

In one embodiment, web server 102 is configured to store a tag and an identifier associated with each block of data of resources identified by URLs. In one embodiment, the tag, identifier and associated URL are stored in a data structure, which resides in a data storage unit (e.g., memory, auxiliary storage device) of web server 102. By storing the identifiers associated with blocks of data, web server 102 and client device 101 will both have knowledge of where that block of data is stored in the cache of client device 101.

System 100 is not to be limited in scope to any one particular network architecture. System 100 may include any number of client devices 101, web servers 102 and networks 103.

Figure 2:
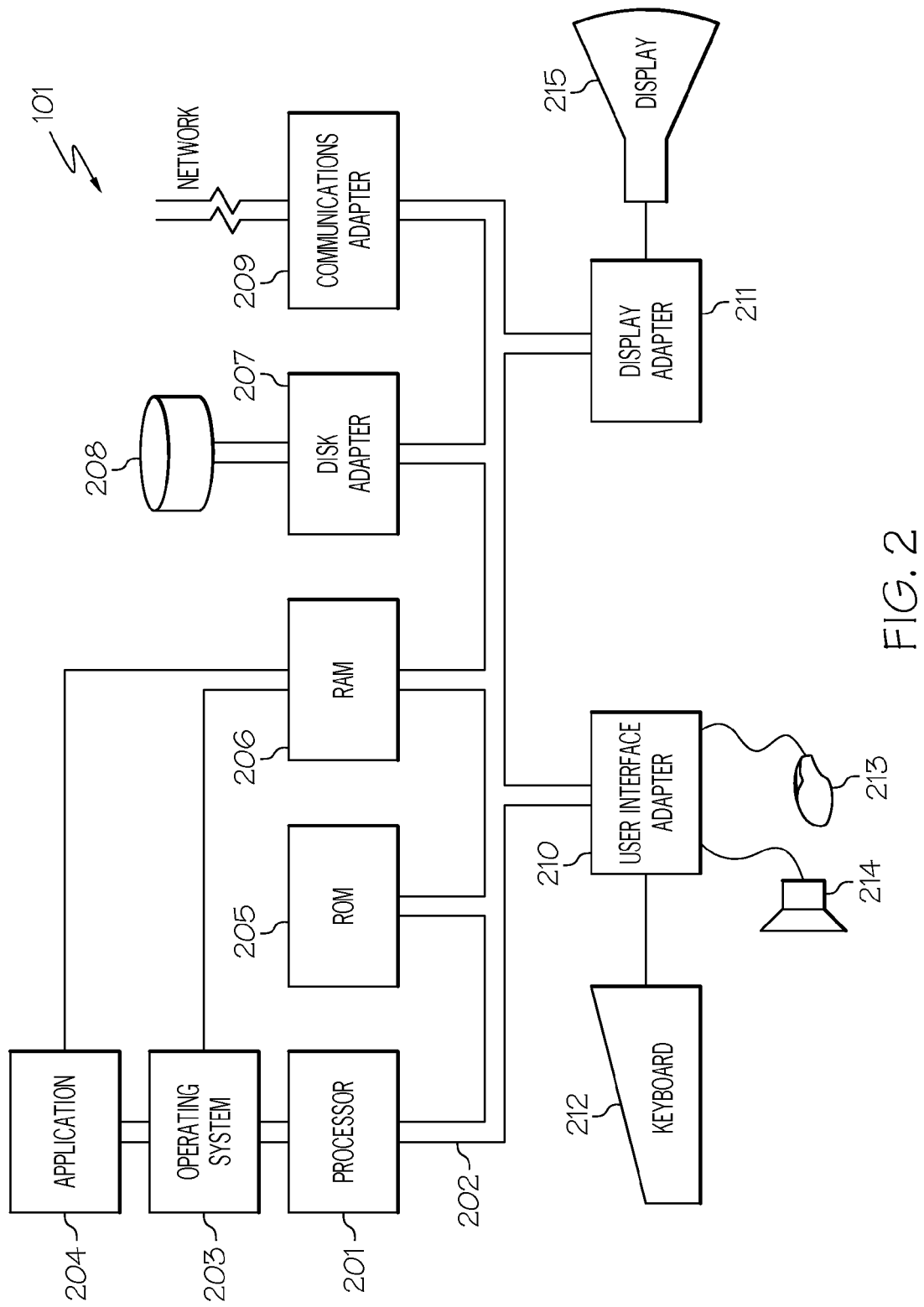
FIG. 2 illustrates a hardware configuration of a client device for practicing the principles of the present invention in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser for requesting resources from web server 102 as discussed further below in connection with FIGS. 3-4, 6A-6B and 7A-7B.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive.

Client device 101 may further include a communications adapter 209 coupled to bus 202. Communications adapter 209 interconnects bus 202 with an outside network (e.g., network 103 of FIG. 1) thereby enabling client device 101 to communicate with other devices (e.g., web server 102 of FIG. 1).

I/O devices may also be connected to client device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101 through keyboard 212 or mouse 213 and receiving output from client device 101 via display 215 or speaker 214. Other input mechanisms may be used to input data to client device 101 that are not shown in FIG. 2, such as display 215 having touch-screen capability and keyboard 212 being a virtual keyboard. Client device 101 of FIG. 2 is not to be limited in scope to the elements depicted in FIG. 2 and may include fewer or additional elements than depicted in FIG. 2.

Figures 3, 4:
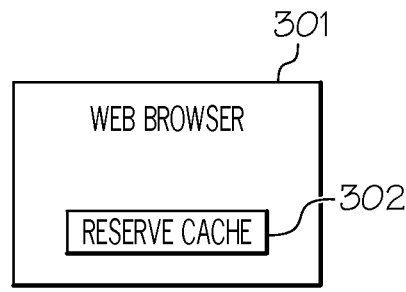
FIG. 3 illustrates a resource cache of a web browser being utilized as a local cache of the client device in accordance with an embodiment of the present invention.
FIG. 4 illustrates a data structure configured to store a copy of the tags, identifiers and associated Uniform Resource Locators (URLs) in accordance with an embodiment of the present invention.

For example, client device 101 includes a local cache that is used for storing blocks of data of a resource along with their associated identifiers and tags as illustrated in FIG. 3.

FIG. 3 illustrates a resource cache 302 of a web browser 301 being utilized as a local cache of client device 101 (FIGS. 1 and 2) in accordance with an embodiment of the present invention. While FIG. 3 illustrates the local cache of client device 101 being a resource cache 302 of web browser 301, the local cache may reside outside of web browser 301, including in processor 201 (FIG. 2) or disk unit 208 (FIG. 2) of client device 101.

As discussed above, a copy of the tags, identifiers and associated URLs may be stored in a data structure. An illustration of such a data structure is described below in connection with FIG. 4.

FIG. 4 illustrates a data structure 400 configured to store a copy of the tags, identifiers (IDs) and associated URLs in accordance with an embodiment of the present invention. For example, URL A may identify a resource with blocks of data that are identified by the identifiers of "sports," "car," "movie" and "finance." The corresponding tag values, which identify a specific version of the associated blocks of data, are "x234dff," "x234dfu," "x324cds," and "x876fxf."

Furthermore, as illustrated in FIG. 4, data structure 400 stores the tags and identifiers associated with URL B. URL B may identify a resource with blocks of data that are identified by the identifiers of "health," "sports," "movie" and "music." The corresponding tag values, which identify a specific version of the associated blocks of data, are "x103fsc," "x234dff," "x324cds," and "x985fcr."

As illustrated in FIG. 4, URLs A and B utilize the same two blocks of data, namely, the blocks of data that are identified by "sports" and "movie." Such information, as will be discussed further below, will be utilized to update content locally from the local cache of client device 101 as opposed to updating content remotely from web server 102.

Figure 5:
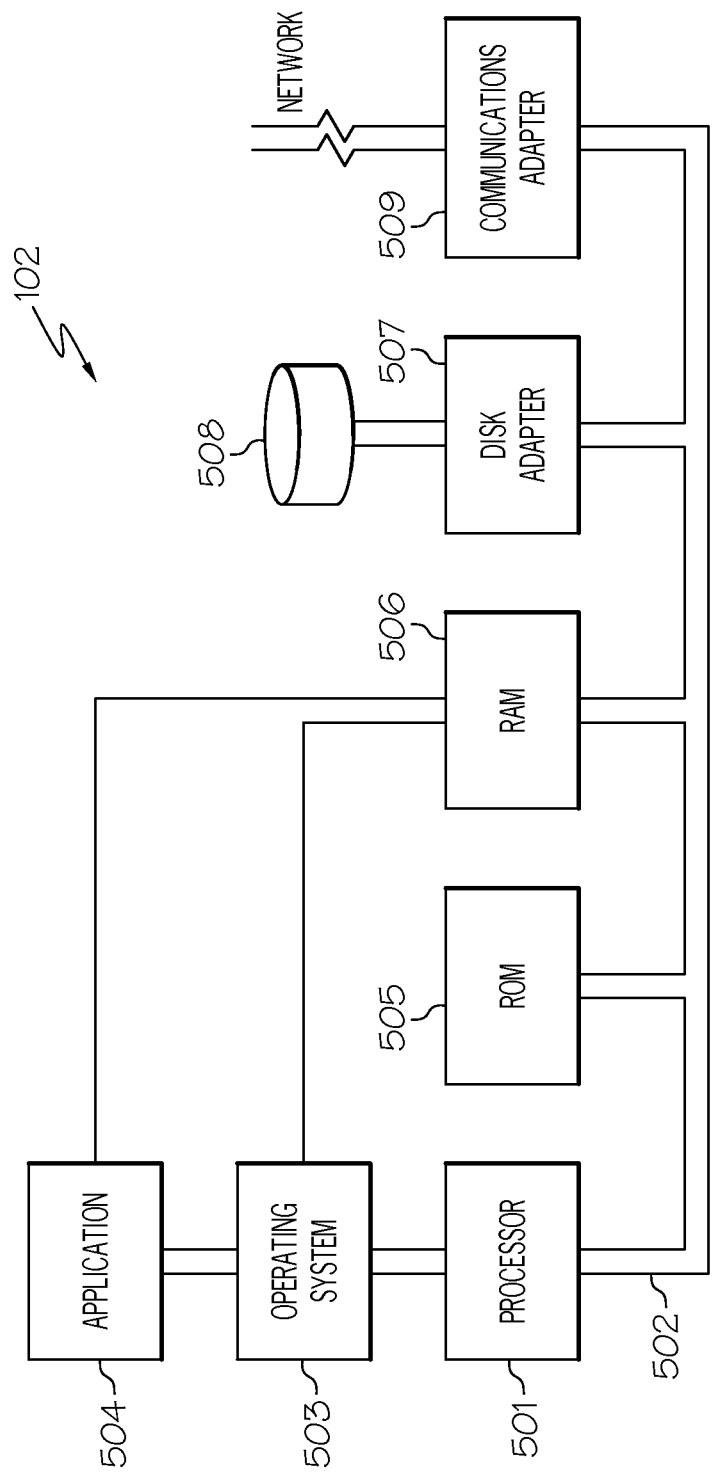
FIG. 5 illustrates a hardware configuration of a web server for practicing the principles of the present invention in accordance with an embodiment of the present invention.

Referring now to FIG. 5, FIG. 5 illustrates a hardware configuration of web server 102 (FIG. 1) which is representative of a hardware environment for practicing the present invention. Referring to FIG. 5, web server 102 has a processor 501 coupled to various other components by system bus 502. An operating system 503 runs on processor 301 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program for storing, processing and delivering web pages to client devices 101 by processing requests from client devices 101 as discussed below in connection with FIGS. 6A-6B and 7A-7B.

Referring again to FIG. 5, read-only memory ("ROM") 505 is coupled to system bus 502 and includes a basic input/output system ("BIOS") that controls certain basic functions of web server 102. Random access memory ("RAM") 506 and disk adapter 507 are also coupled to system bus 502. It should be noted that software components including operating system 503 and application 504 may be loaded into RAM 506, which may be web server's 102 main memory for execution. Disk adapter 507 may be an integrated drive electronics ("IDE") adapter that communicates with a disk unit 508, e.g., disk drive.

As discussed above, web server 102 may store the tag and the identifier associated with each block of data for the resources identified by URLs. In one embodiment, the tag, identifier and associated URL are stored in a data structure, which resides in a data storage unit (e.g., memory 506, auxiliary storage device, such as disk unit 508) of web server 102. An example of such a data structure corresponds to data structure 400 of FIG. 4. By storing the identifiers associated with blocks of data, web server 102 and client device 101 will both have knowledge of where that block of data is stored in the local cache (e.g., resource cache 302) of client device 101.

Web server 102 may further include a communications adapter 509 coupled to bus 502. Communications adapter 509 interconnects bus 502 with an outside network (e.g., network 103 of FIG. 1) thereby enabling web server 102 to communicate with other devices, such as client device 101 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, HTTP is designed to permit intermediate network elements to improve or enable communications between clients and servers. However, fetching a resource using HTTP can be time consuming. For example, the retrieval of a resource may require several interactions between the client and the server. As a result, an HTTP cache may be utilized by the web browser to store local copies of web resources for faster retrieval the next time the resource is required. When a resource is fully cached, the web browser may choose to not contact the server at all and simply use its own cached copy thereby improving performance by reducing the interactions between the client and the server as well as reducing server load (server does not need to fetch the requested resource) and improving response time (faster to retrieve resource from the cache than from the server). However, such HTTP caching mechanisms, which utilize the HTTP/1.1 protocol, cache the resource based on the URL. Hence, when a client requests a resource associated with a different URL than those resources cached, the client will have to request the resource from the server. However, the requested resource may include content that was previously cached, even though it is associated with a different URL. As a result, performance is hindered since the client cannot reuse the previously cached content since it is associated with a different URL and the client is required to request the content from the server. Therefore, there is a need in the art for improving performance in connection with requesting resources by reducing server load and improving response time by having the client be able to utilize previously cached content that is requested even though it is associated with a different URL.

Figure 6A:
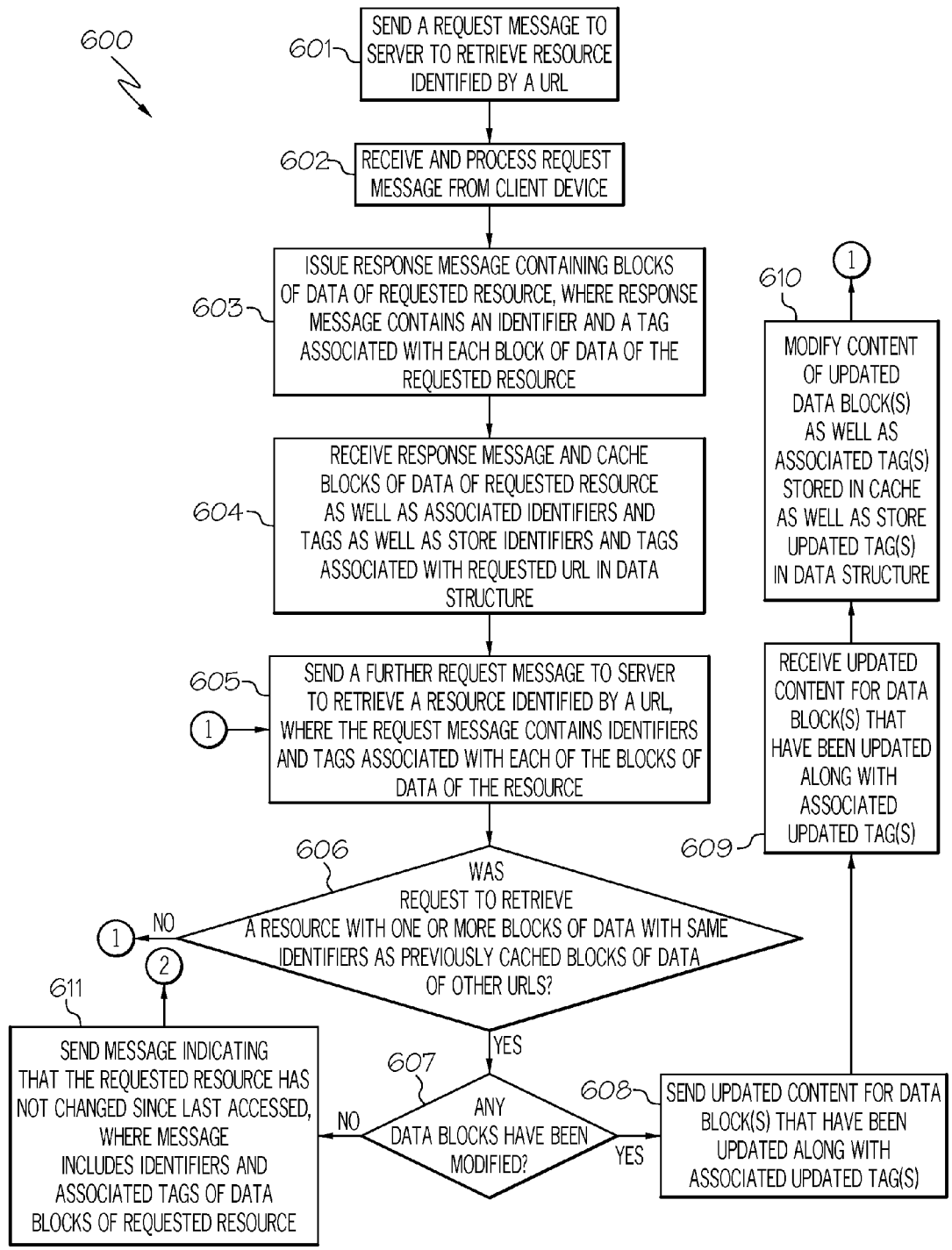
FIGS. 6A-6B are a flowchart of a method for improving performance in connection with requesting resources by allowing content sharing of data blocks across resources identified by different URLs in accordance with an embodiment of the present invention.
Figure 6B:
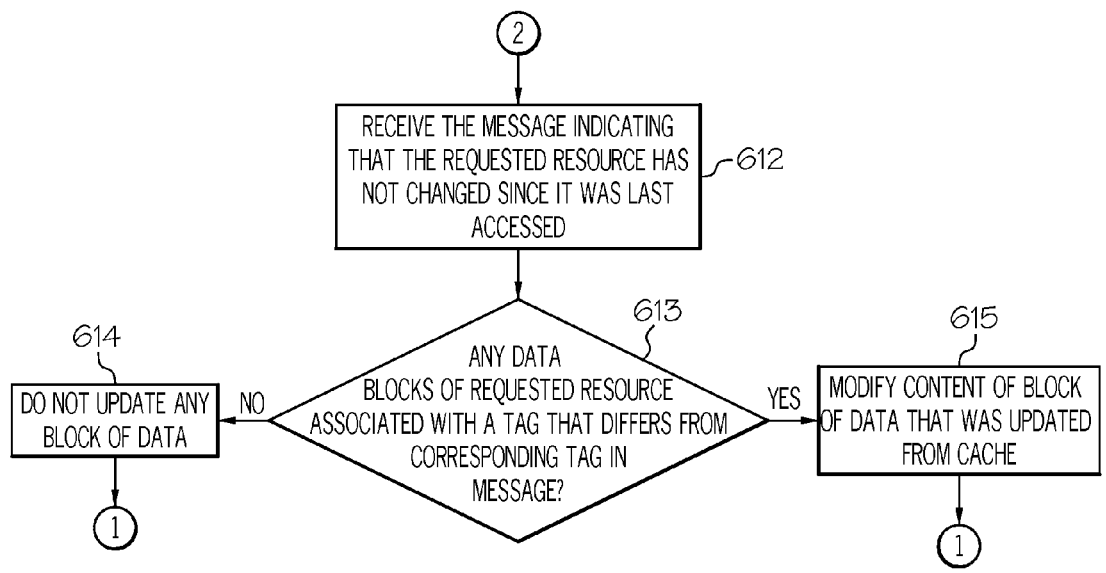
Figure 7A:
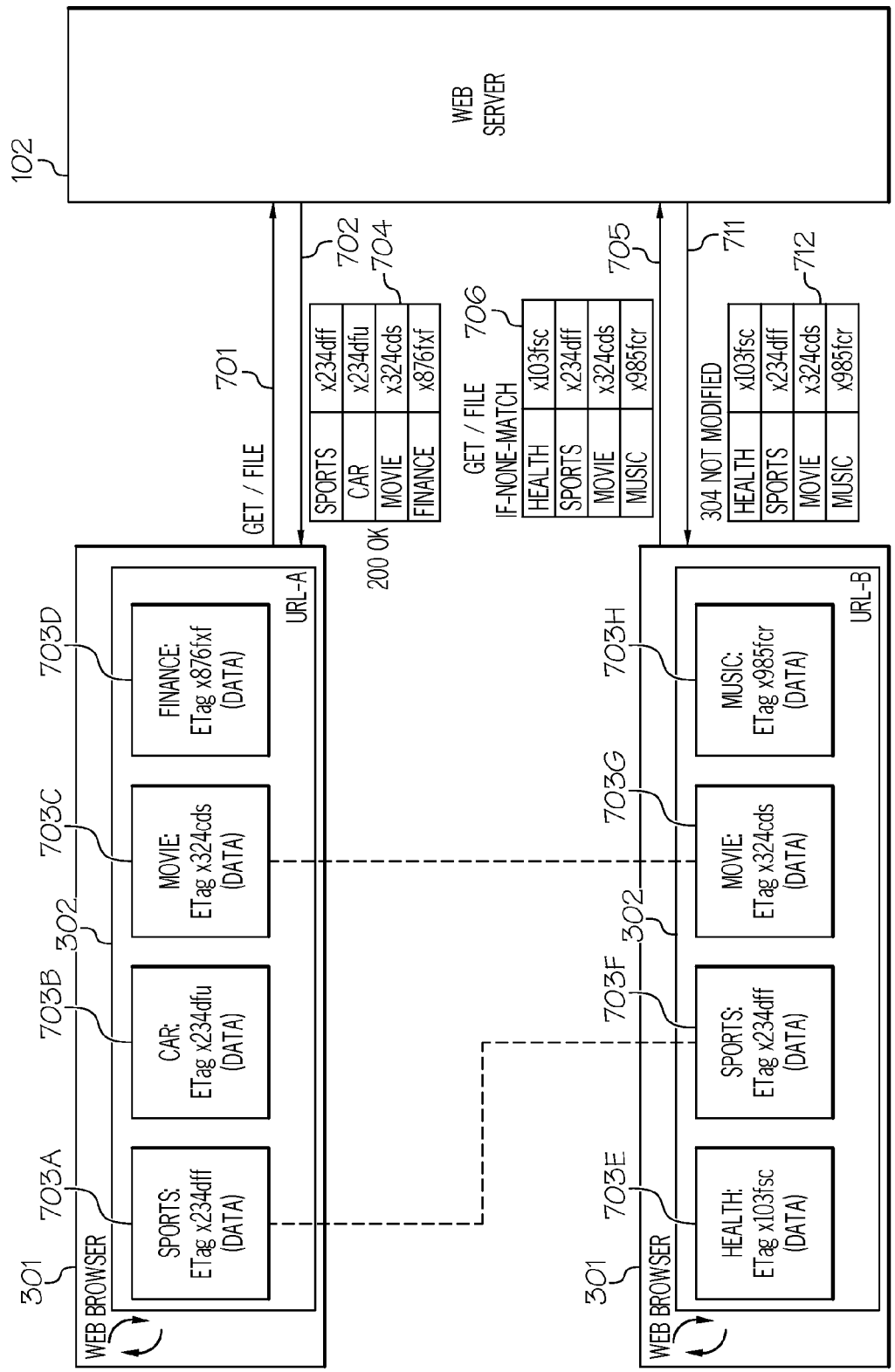
FIGS. 7A-7B are diagrams illustrating the communications between the client device and the web server in connection with the method of FIGS. 6A-6B in accordance with an embodiment of the present invention.
Figure 7B:
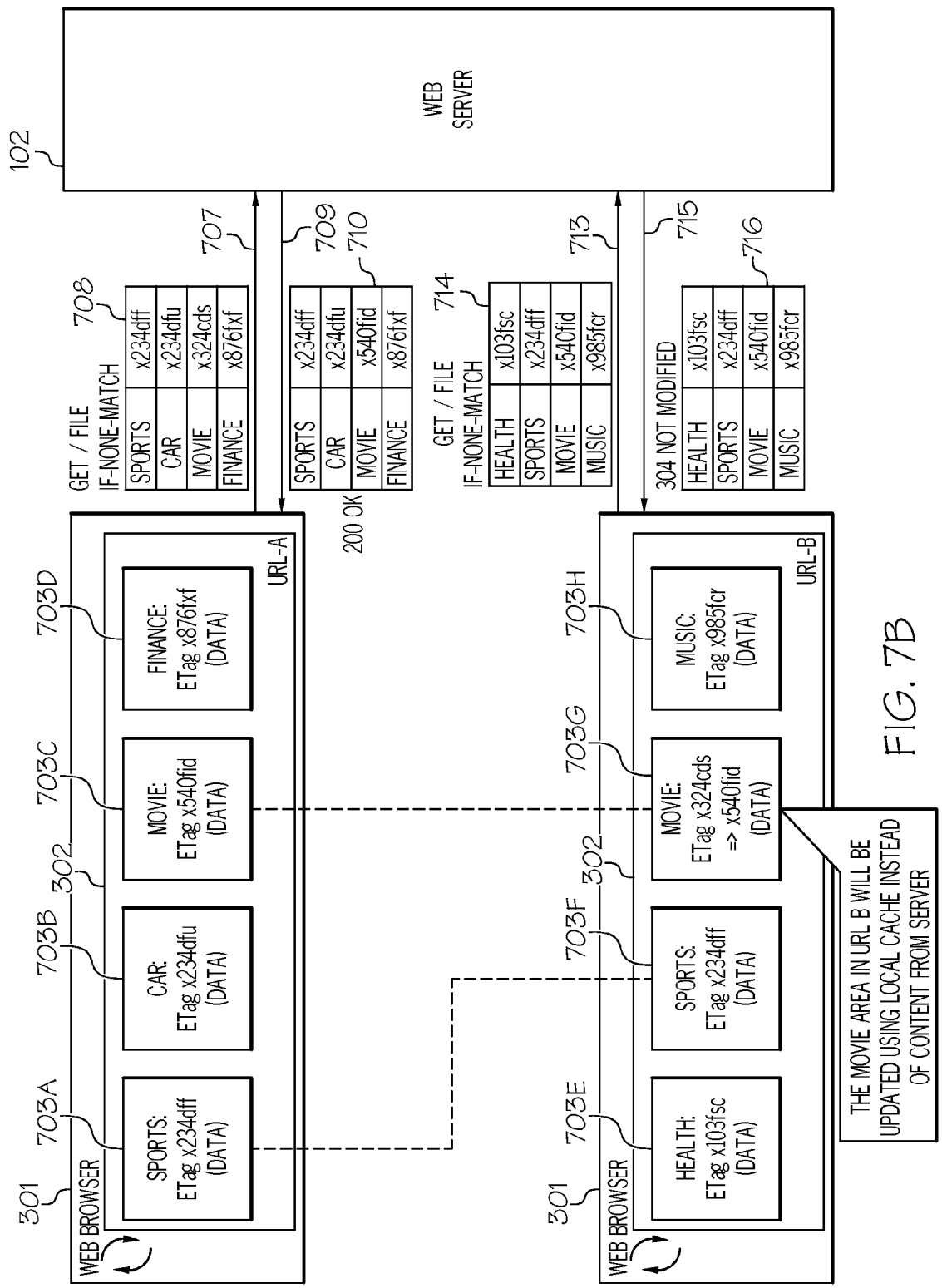

The principles of the present invention provide a means for improving performance in connection with requesting resources by reducing server load and improving response time by allowing content sharing of data blocks across resources identified by different Uniform Resource Locators (URLs) as discussed below in connection with FIGS. 6A-6B and 7A-7B. That is, using the principles of the present invention, the client will able to utilize previously cached content that is requested even though it is associated with a different URL. FIGS. 6A-6B are a flowchart of a method for improving performance in connection with requesting resources by allowing content sharing of data blocks across resources identified by different Uniform Resource Locators (URLs). FIGS. 7A-7B are diagrams illustrating the communications between client device 101 and web server 102 in connection with the method of FIGS. 6A-6B.

As stated above, FIGS. 6A-6B are a flowchart of a method 600 for improving performance in connection with requesting resources by allowing content sharing of data blocks across resources identified by different Uniform Resource Locators (URLs) in accordance with an embodiment of the present invention. FIGS. 6A-6B will be discussed below in conjunction with FIGS. 7A-7B which depict communications between client device 101 and web server 102 in connection with method 600 of FIGS. 6A-6B in accordance with an embodiment of the present invention.

Referring to FIG. 6A, in conjunction with FIGS. 1-5 and 7A-7B, in step 601, web browser 301 sends a request message to web server 102 to retrieve a resource identified by a URL. For example, the user of client device 101 may enter a URL in client device's web browser 301. Web browser 301 may then send a request message to web server 102, such as via HTTP, to retrieve the resource identified by the URL entered by the user of client device 101. In one embodiment, in step 601, web browser 301 is initiating a new request to obtain a resource identified by a URL (e.g., URL A) which has not previously been cached in the local cache (e.g., resource cache 302) of client device 101.

An illustration of step 601 is provided in FIG. 7A. Referring to FIG. 7A, web browser 301 sends a request message to web server 102 via an HTTP Get/file request 701 to retrieve a resource identified by URL A.

In step 602, web server 102 receives and processes the request message from client device 101.

In step 603, web server 102 issues a response message to client device 101 containing the blocks of data of the requested resource. Furthermore, the response message includes an identifier and a tag associated with each block of data of the requested resource. The "identifier," as used herein, identifies a storage area in the local cache (e.g., resource cache 302) of client device 101. The "tag," as used herein, identifies a specific version of the associated block of data found at a uniform resource locator, where such tags are assigned by web server 102. An illustration of such a response message is shown in FIG. 7A.

Referring to FIG. 7A, web server 102 issues a response message 702 that includes the data blocks 703A-703D of URL A (web browser 301 had previously requested the resource identified by URL A) identified by identifiers "sports," "car," "movie," and "finance," respectively. Furthermore, response message 702 includes tag values associated with data blocks 703A-703D, such as "x234dff," "x234dfu," "x324cds," and "x876fxf," respectively. Such identifiers and tags are shown in data structure 704. In one embodiment, such a data structure is placed in the header of the response message to client device 101.

Additionally, as illustrated in FIG. 7A, web server 102 issues the status code of 200 indicating a successful HTTP request.

In step 604, web browser 301 receives the response message and caches the blocks of data of the requested resource as well as the associated identifiers and tags as well as stores the identifiers and tags associated with the requested URL in a data structure, such as data structure 400.

For example, as illustrated in FIG. 7A, data blocks 703A-703D associated with the requested resource identified by URL A is stored in resource cache 302. Furthermore, the identifiers and tags (e.g., ETags) associated with these data blocks are also stored in resource cache 302. Additionally, the identifiers and tags associated with these data blocks along with the associated URL (e.g., URL A) are stored in data structure 400.

In step 605, web browser 301 sends a further request message to web server 102 to retrieve a resource identified by a URL, where the request message contains identifiers and tags associated with each of the blocks of data of the resource, such as obtained from data structure 400. For example, the user of client device 101 may enter a URL in client device's web browser 301. Web browser 301 may then send a request message to web server 102, such as via HTTP, to retrieve the resource identified by the URL entered by the user of client device 101

In step 606, a determination is made by web browser 301 as to whether the request was to retrieve a resource with one or more blocks of data with the same identifiers as previously cached blocks of data of other URLs.

If web browser 301 did not send a further request message to web server 102 to retrieve a resource with one or more blocks of data with the same identifiers as previously cached blocks of data of other URLs, then web browser 301 later sends another request message to web server 102 to retrieve a resource in step 605.

If, however, web browser 301 sent a further request message to web server 102 to retrieve a resource with one or more blocks of data with the same identifiers as previously cached blocks of data of other URLs, then, in step 607, a determination is made by web server 102 as to whether any of the data blocks of the requested resource has been modified. In one embodiment, web server 102 determines whether any of the data blocks of the requested resource has been modified by comparing the tags in the request message with the corresponding tags for the corresponding data blocks stored in the data structure of web server 102.

For example, referring to FIG. 7A, web browser may had previously cached the data blocks 703E-703H of the resource identified by URL B. Data blocks 703E-703H are identified by identifiers "health," "sports," "movie," and "music," respectively. Furthermore, data blocks 703E-703H are associated with tag values "x103fsc," "x234dff," "x324cds, and "x985fcr," respectively.

As illustrated in FIG. 7A, data block 703F of URL B has the same identifier "sports" as the identifier for data block 703A of URL A. Furthermore, as illustrated in FIG. 7A, data block 703G of URL B has the same identifier "movie" as the identifier for data block 703C of URL A. Hence, there is an overlap of data blocks between these two resources. That is, these two resources utilize the same content identified by the same identifiers.

As further illustrated in FIG. 7A, web browser 301 sends a request message to web server 102 via an HTTP Get/file request 705 to retrieve a resource identified by URL B, where the identifiers and tags of the resource identified by URL B is located in a data structure 706, which may be stored in the "If-None-Match" HTTP request header.

Returning to FIG. 6A, in conjunction with FIGS. 1-5 and 7A-7B, if there has been a modification to one or more data blocks of the requested resource, then in step 608, web server 102 sends the updated content for those data block(s) that have been updated along with their associated updated tag(s).

In step 609, web browser 301 receives the updated content for those data block(s) that have been updated along with their associated updated tag(s).

In step 610, web browser 301 modifies the content of the data block(s) and the associated tag(s) stored in the local cache (e.g., resource cache 302) of client device 101 using the received updated content and updated tag(s). Web browser 301 further updates data structure 400 using the received updated tag(s).

After modifying the content of the data block(s) and the associated tag(s) stored in the local cache of client device 101, web browser 301 later sends another request message to web server 102 to retrieve a resource in step 605.

For example, as illustrated in FIG. 7B, web browser 301 sends a request message to web server 102 via an HTTP Get/file request 707 to retrieve a resource identified by URL A, where the request includes the identifiers and tags of the resource identified by URL A obtained from data structure 400. In one embodiment, the identifiers and tags of the resource identified by URL A are located in a data structure 708, which may be stored in the "If-None-Match" HTTP request header.

Web server 102 then issues a response message 709 that includes the data blocks 703A-703D of URL A identified by identifiers "sports," "car," "movie," and "finance," respectively. Furthermore, response message 709 includes tag values associated with data blocks 703A-703D, such as "x234dff," "x234dfu," "x540fid," and "x876fxf," respectively. Such identifiers and tags are shown in data structure 710. In one embodiment, such a data structure is placed in the header of the response message to client device 101. Additionally, as illustrated in FIG. 7B, web server 102 issues the status code of 200 indicating a successful HTTP request.

As illustrated in FIG. 7B, the content to data block 703C identified by "movie" has been updated as indicated by the updated tag ("x540fid" as opposed to "x324cds") sent by web server 102. Web server 102 determined that the content to data block 703C was outdated based on the fact that the value of its associated tag ("x324cds") sent in the request message did not match the value of the corresponding tag ("x540fid") for that data block stored by web server 102. As discussed above, the tag identifies the specific version of the associated block of data found at the uniform resource locator, where the tag is assigned by web server 102.

Web browser 301 will then modify the content of data block 703C with the updated content along with updating its associated tag with the received updated tag ("x540fid") as illustrated in FIG. 7B. Furthermore, web browser 301 will update data structure 400 to replace the outdated tag of "x324cds" with the updated tag of "x540fid."

Returning to step 607 of FIG. 6A, in conjunction with FIGS. 1-5 and 7A-7B, if there has not been a modification to a data block of the requested resource, then, in step 611, web server 102 sends a response message indicating that the requested resource has not changed since it was last accessed. Furthermore, the response message may include the identifiers and tags associated with the data blocks of the requested resource, which may be stored in the header of the response message.

Referring to FIG. 6B, in conjunction with FIGS. 1-5 and 7A-7B, in step 612, web browser 301 receives the message indicating that the requested resource has not changed since it was last accessed.

For example, as illustrated in FIG. 7A, web server 102 sends a message 711 to client device 101 with the HTTP status code of 304 (HTTP 304 Not Modified status) indicating that the tag values match and that the data blocks of the resource have not changed. Furthermore, as illustrated in FIG. 7A, the response message may include the identifiers and tags associated with the data blocks of the requested resource stored in a data structure 712, which may be stored in the header of the response message.

Returning to FIG. 6B, in conjunction with FIGS. 1-5 and 7A-7B, in step 613, a determination is made by web browser 301 as to whether any of the data blocks of the requested resource is associated with a tag stored in the local cache (e.g., resource cache 302) that differs from the corresponding tag in the received message.

If none of the data blocks of the requested resource is associated with a tag stored in the local cache (e.g., resource cache 302) that differs from the corresponding tag in the received message, then, in step 614, web browser 301 does not update any of the blocks of data of the requested resource in the local cache.

Web browser 301 later sends another request message to web server 102 to retrieve a resource in step 605.

If, however, at least one of the data blocks of the requested resource is associated with a tag stored in the local cache (e.g., resource cache 302) that differs from the corresponding tag in the received message, then, in step 615, web browser 301 modifies the content of the block of data that was updated using content stored in the local cache (e.g., resource cache 302) of client device 101. Furthermore, the associated tag is modified in the local cache (e.g., resource cache 302) of client device 101 using the tag received in the response message. Web browser 301 later sends another request message to web server 102 to retrieve a resource in step 605.

In one embodiment, web browser 301 compares the tags received in the response message with the corresponding tags stored in the local cache of client device 101 for those data blocks of the requested resource. If there is not a match, then client device 101 will update the content of the data block in the local cache of client device 101 whose tag does not match the corresponding tag in the received message using the content of a data block associated with the same identifier and associated with the tag in the response message, even though it is associated with a different resource. In this manner, the content for that data block can be updated using the local cache of client device 101 as opposed to being required to fetch the updated content from web server 102. As a result, performance is improved by reducing server load and improving response time by having client device 101 be able to utilize previously cached content that is requested even though it is associated with a different URL.

For example, as illustrated in FIG. 7B, web browser 301 sends a request message to web server 102 via an HTTP Get/file request 713 to retrieve a resource identified by URL B, where the request message includes the identifiers and tags of the resource identified by URL B. In one embodiment, the identifiers and tags of the resource identified by URL B are located in a data structure 714, which may be stored in the "If-None-Match" HTTP request header.

As illustrated in FIG. 7B, the tags that are included in data structure 714 include the latest version of the tags stored in data structure 400. For example, the tag stored in the local cache (e.g., resource cache 302) of client device 101 associated with the data block 703G identified by "movie" has the value of "x324cds." However, the tag stored in data structure 400 that is associated with the data block identified by "movie" has the value of "x540fid" because the content and tag for this data block was previously modified for the resource identified by URL A as previously discussed above (see discussion regarding steps 608-610 in connection with FIG. 7B).

As a result, when web server 102 determines whether there has been modification to any of the data blocks of the requested resource, web server 102 determines that there has been no modifications to any of the data blocks of the requested resource since the values of the tags in data structure 714 match the values of the tags of those associated data blocks stored by web server 102. Web server 102 then sends a message 715 to client device 101 with the HTTP status code of 304 (HTTP 304 Not Modified status) indicating that the tag values match and that the data blocks of the resource have not changed. Furthermore, as illustrated in FIG. 7B, the response message may include the identifiers and tags associated with the data blocks of the requested resource stored in a data structure 716, which may be stored in the header of the response message.

Web browser 301 then compares the values of the tags received in the response message ("x103fsc," "x234dff," "x540fid," and "x985fcr," as shown in data structure 716) with the corresponding tag values stored in the local cache of client device 101 ("x103fsc," "x234dff," "x324cds," and "x985fcr") for the data blocks identified by "health," "sports," "movie," and "music," respectively.

Since the tag value ("x324cds") associated with the data block identified by "movie" that is stored in the local cache (e.g., resource cache 302) does not match the corresponding tag value ("x540fid") in the response message, client device 101 will update the content of that data block in the local cache of client device 101. For example, the content of data block 703G identified by "movie" for URL B will be updated using the content of data block 703C identified by "movie" for URL A since that data block 703C is associated with the same identifier ("movie") and associated with a tag value ("x540fid") that matches the tag value in the response message from web server 102. Furthermore, the tag with the value of "x324cds" will be updated with the value of "x540fid" in data block 703G.

In this manner, the content for that data block can be updated using the local cache of client device 101 as opposed to being required to fetch the updated content from web server 102. As a result, performance is improved by reducing server load and improving response time by having client device 101 be able to utilize previously cached content that is requested even though it is associated with a different URL.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving performance in connection with requesting resources, the method comprising:
   sending a first request message to a server to retrieve a first resource identified by a first uniform resource locator, wherein said first request message comprises identifiers and tags associated with blocks of data of said first resource which are stored in a cache;
   receiving a first response message from said server, wherein said first response message contains updated content for a first block of data and an updated tag associated with said first block of data of said first resource in response to a value of a first tag in said first request message associated with said first block of data not matching a value of a tag stored in said server associated with said first block of data;
   modifying, by a processor, content of said first block of data and said associated first tag of said first resource in said cache using said received updated content and said updated tag;
   sending a second request message to said server to retrieve a second resource identified by a second uniform resource locator, wherein said second request message comprises identifiers and tags associated with blocks of data of said second resource which are stored in said cache, wherein content of a second block of data of said second resource corresponds to an older version of content of said first block of data of said first resource that was modified, wherein a second tag associated with said second block of data of said second resource corresponds to an older version of said first tag, wherein said tags in said second request message comprises said first tag;
   receiving a second response message from said server indicating that said second resource has not change since last accessed; and
   modifying, by said processor, content of said second block of data and said associated second tag of said second resource stored in said cache using content from said first block of data and said first tag of said first resource, respectively, from said cache.

2. The method as recited in claim 1 further comprising:
   sending a third request message to said server to retrieve said first resource, said second resource or a third resource identified by said first uniform resource locator, said second uniform resource locator or a third uniform resource locator, respectively;
   receiving a third response message from said server, wherein said third response message contains blocks of data of said requested first resource, second resource or third resource, wherein said response message further contains an identifier and a tag associated with each block of data of said requested first resource, second resource or third resource; and
   caching said blocks of data of said requested first resource, second resource or third resource and said associated identifiers and tags in said cache.

3. The method as recited in claim 1, wherein said identifiers identify a storage area in said cache and said tags identify a specific version of a block of data found at a uniform resource locator.

4. The method as recited in claim 1, wherein said identifiers and said tags are stored in a header of said first and second request messages.

5. The method as recited in claim 1 further comprising:
   storing a copy of uniform resource locators, identifiers and tags associated with blocks of data in a data structure; and
   using said tags stored in said data structure in said first and second request messages.

6. The method as recited in claim 1 further comprising:
   sending said identifiers and tags in said second request message in a "If-None-Match" HTTP request header.

7. The method as recited in claim 1 further comprising:
   receiving said second response message with an HTTP 304 Not Modified status in response to values of said tags in said second request message matching values of tags associated with blocks of data of said second resource in said server.

8. The method as recited in claim 7 further comprising:
   comparing values of tags for blocks of data of said second resource stored in said second response message with values of tags for blocks of data of said second resource stored in said cache in response to receiving said HTTP 304 Not Modified status; and
   modifying content of said second block of data and said associated second tag of said second resource stored in said cache using content from said first block of data and said first tag of said first resource, respectively, from said cache in response to a value of a tag associated with said second block of data stored in said second response message not matching a value of said second tag stored in said cache.

9. A computer program product for improving performance in connection with requesting resources, the computer program product comprising a computer readable storage medium having program code embodied therewith, the program code comprising the programming instructions for:
   sending a first request message to a server to retrieve a first resource identified by a first uniform resource locator, wherein said first request message comprises identifiers and tags associated with blocks of data of said first resource which are stored in a cache;
   receiving a first response message from said server, wherein said first response message contains updated content for a first block of data and an updated tag associated with said first block of data of said first resource in response to a value of a first tag in said first request message associated with said first block of data not matching a value of a tag stored in said server associated with said first block of data;
   modifying content of said first block of data and said associated first tag of said first resource in said cache using said received updated content and said updated tag;
   sending a second request message to said server to retrieve a second resource identified by a second uniform resource locator, wherein said second request message comprises identifiers and tags associated with blocks of data of said second resource which are stored in said cache, wherein content of a second block of data of said second resource corresponds to an older version of content of said first block of data of said first resource that was modified, wherein a second tag associated with said second block of data of said second resource corresponds to an older version of said first tag, wherein said tags in said second request message comprises said first tag;
   receiving a second response message from said server indicating that said second resource has not change since last accessed; and modifying content of said second block of data and said associated second tag of said second resource stored in said cache using content from said first block of data and said first tag of said first resource, respectively, from said cache.

10. The computer program product as recited in claim 9, wherein the program code further comprises the programming instructions for:
sending a third request message to said server to retrieve said first resource, said second resource or a third resource identified by said first uniform resource locator, said second uniform resource locator or a third uniform resource locator, respectively;
receiving a third response message from said server, wherein said third response message contains blocks of data of said requested first resource, second resource or third resource, wherein said response message further contains an identifier and a tag associated with each block of data of said requested first resource, second resource or third resource; and
caching said blocks of data of said requested first resource, second resource or third resource and said associated identifiers and tags in said cache.

11. The computer program product as recited in claim 9, wherein said identifiers identify a storage area in said cache and said tags identify a specific version of a block of data found at a uniform resource locator.

12. The computer program product as recited in claim 9, wherein said identifiers and said tags are stored in a header of said first and second request messages.

13. The computer program product as recited in claim 9, wherein the program code further comprises the programming instructions for:
storing a copy of uniform resource locators, identifiers and tags associated with blocks of data in a data structure; and
using said tags stored in said data structure in said first and second request messages.

14. The computer program product as recited in claim 9, wherein the program code further comprises the programming instructions for:
sending said identifiers and tags in said second request message in a "If-None-Match" HTTP request header.

15. The computer program product as recited in claim 9, wherein the program code further comprises the programming instructions for:
receiving said second response message with an HTTP 304 Not Modified status in response to values of said tags in said second request message matching values of tags associated with blocks of data of said second resource in said server.

16. The computer program product as recited in claim 15, wherein the program code further comprises the programming instructions for:
comparing values of tags for blocks of data of said second resource stored in said second response message with values of tags for blocks of data of said second resource stored in said cache in response to receiving said HTTP 304 Not Modified status; and
modifying content of said second block of data and said associated second tag of said second resource stored in said cache using content from said first block of data and said first tag of said first resource, respectively, from said cache in response to a value of a tag associated with said second block of data stored in said second response message not matching a value of said second tag stored in said cache.

17. A system, comprising:
a memory unit for storing a computer program for improving performance in connection with requesting resources; and
a processor coupled to the memory unit, wherein the processor is configured to execute the program instructions of the computer program comprising:
sending a first request message to a server to retrieve a first resource identified by a first uniform resource locator, wherein said first request message comprises identifiers and tags associated with blocks of data of said first resource which are stored in a cache;
receiving a first response message from said server, wherein said first response message contains updated content for a first block of data and an updated tag associated with said first block of data of said first resource in response to a value of a first tag in said first request message associated with said first block of data not matching a value of a tag stored in said server associated with said first block of data;
modifying content of said first block of data and said associated first tag of said first resource in said cache using said received updated content and said updated tag;
sending a second request message to said server to retrieve a second resource identified by a second uniform resource locator, wherein said second request message comprises identifiers and tags associated with blocks of data of said second resource which are stored in said cache, wherein content of a second block of data of said second resource corresponds to an older version of content of said first block of data of said first resource that was modified, wherein a second tag associated with said second block of data of said second resource corresponds to an older version of said first tag, wherein said tags in said second request message comprises said first tag;
receiving a second response message from said server indicating that said second resource has not change since last accessed; and
modifying content of said second block of data and said associated second tag of said second resource stored in said cache using content from said first block of data and said first tag of said first resource, respectively, from said cache.

18. The system as recited in claim 17, wherein the program instructions of the computer program further comprise:
sending a third request message to said server to retrieve said first resource, said second resource or a third resource identified by said first uniform resource locator, said second uniform resource locator or a third uniform resource locator, respectively;
receiving a third response message from said server, wherein said third response message contains blocks of data of said requested first resource, second resource or third resource, wherein said response message further contains an identifier and a tag associated with each block of data of said requested first resource, second resource or third resource; and
caching said blocks of data of said requested first resource, second resource or third resource and said associated identifiers and tags in said cache.

19. The system as recited in claim 18, wherein said identifiers identify a storage area in said cache and said tags identify a specific version of a block of data found at a uniform resource locator.

20. The system as recited in claim 18, wherein said identifiers and said tags are stored in a header of said first and second request messages.

* * * * *